United States Patent
Watanabe et al.

(10) Patent No.: US 10,730,466 B2
(45) Date of Patent: Aug. 4, 2020

(54) VEHICLE SEAT WITH INTEGRAL BRACKET

(71) Applicant: TACHI-S CO., LTD., Akishima-shi, Tokyo (JP)

(72) Inventors: Akira Watanabe, Tokyo (JP); Takayuki Ohmori, Tokyo (JP)

(73) Assignee: TACHI-S Co., Ltd., Tokyo (JP)

( * ) Notice: Subject to any disclaimer, the term of this patent is extended or adjusted under 35 U.S.C. 154(b) by 132 days.

(21) Appl. No.: 16/095,352

(22) PCT Filed: Apr. 28, 2017

(86) PCT No.: PCT/JP2017/017083
§ 371 (c)(1),
(2) Date: Oct. 20, 2018

(87) PCT Pub. No.: WO2017/203940
PCT Pub. Date: Nov. 30, 2017

(65) Prior Publication Data
US 2019/0126875 A1    May 2, 2019

(30) Foreign Application Priority Data
May 23, 2016 (JP) .................. 2016-102848

(51) Int. Cl.
*B60R 21/015* (2006.01)
*B60N 2/02* (2006.01)
(Continued)

(52) U.S. Cl.
CPC ...... *B60R 21/01554* (2014.10); *B60N 2/0244* (2013.01); *B60N 2/0727* (2013.01);
(Continued)

(58) Field of Classification Search
CPC ............ B60R 21/01554; B60N 2/0244; B60N 2/0727; B60N 2/0881; B60N 2/12; B60N 2002/0272
See application file for complete search history.

(56) References Cited

U.S. PATENT DOCUMENTS 4,909,560 A * 3/1990 Ginn .................. B60N 2/06 296/65.15
7,147,261 B2 * 12/2006 Ventura .............. B60N 2/002 296/65.13
(Continued)

FOREIGN PATENT DOCUMENTS

JP    H02143218 U  * 12/1990
JP    H0513840 U   *  2/1993
(Continued)

OTHER PUBLICATIONS

Translation of written opinion of PCT/JP17/17083 (Year: 2017).*
International Search Report from International Patent Application No. PCT/JP2017/017083, dated Jun. 27, 2017.

*Primary Examiner* — Hilary L Gutman
(74) *Attorney, Agent, or Firm* — SGPatents PLLC

(57) ABSTRACT

Provided is a vehicle seat (100) comprising: a seat cushion (101); a seat back (102) capable of being folded toward the seat cushion (101); a slide rail (110) movable in the front-back direction with the seat cushion (101) mounted thereon; a stationary rail (120) for guiding the slide rail (110); and a drive motor (160) for driving the slide rail (110) in the front-back direction along the stationary rail (120). The vehicle seat (100) is configured such that an integral sensor bracket (130) on which a magnetism sensor (141) and a limit switch (151) are mounted is affixed to the slide rail (120), and a magnetic body (142) which is detected by the mag-
(Continued)

netism sensor (141) and a detection plate (153) which activates the limit switch (151) are mounted to the stationary rail (120).

10 Claims, 5 Drawing Sheets

(51) Int. Cl.
*B60N 2/07* (2006.01)
*B60N 2/08* (2006.01)
*B60N 2/12* (2006.01)

(52) U.S. Cl.
CPC .............. *B60N 2/0881* (2013.01); *B60N 2/12* (2013.01); *B60N 2002/0272* (2013.01)

(56) References Cited

U.S. PATENT DOCUMENTS

| | | | |
|---|---|---|---|
| 2002/0125396 A1* | 9/2002 | Kume | B60N 2/0715 248/429 |
| 2003/0117000 A1* | 6/2003 | Barnabo | B60N 2/0224 297/217.1 |
| 2004/0100388 A1 | 5/2004 | Yoshida et al. | |
| 2010/0219813 A1* | 9/2010 | Ito | B60N 2/0705 324/207.22 |
| 2011/0017897 A1* | 1/2011 | Christoffel | B60R 21/01554 248/429 |

FOREIGN PATENT DOCUMENTS

| | | | |
|---|---|---|---|
| JP | H0635027 U | * | 5/1994 |
| JP | 2004-210169 A | | 7/2004 |
| JP | 2006-347514 A | | 12/2006 |

* cited by examiner

VEHICLE SEAT WITH INTEGRAL BRACKET

TECHNICAL FIELD

The present invention relates to a vehicle seat equipped with a function to slide a seat forward and backward. Particularly, the invention relates to a vehicle seat equipped with an integral bracket in which a sensor and a switch for detecting a position of the seat are mounted on a common bracket.

BACKGROUND ART

As the vehicle seat equipped with the function to slide the seat forward and backward, Japanese Unexamined Patent Application Publication No. 2004-210169 (Patent Literature 1) discloses a vehicle seat which is equipped with a sensor unit combining a magnetic actuator and a magnetic detecting element as a position sensor for detecting a position of the seat with respect to a sliding direction. Patent Literature 1 discloses a method where according to information on the seat position detected by the position sensor, a start time of airbag deployment is advanced when the seat is located at the front while the start time of airbag deployment is delayed when the seat is located at the back.

Further, Japanese Unexamined Patent Application Publication No. 2006-347514 (Patent Literature 2) discloses a seat equipped with a slide mechanism where the seat reaching a full-forward position is detected by a limit switch so that the seat is stopped and locked.

CITATION LIST

Patent Literature

PTL 1: Japanese Unexamined Patent Application Publication No. 2004-210169
PTL 2: Japanese Unexamined Patent Application Publication No. 2006-347514

SUMMARY OF INVENTION

Technical Problem

The vehicle seats include a type (walk-in function) where a front passenger seat of double row seats or a door side seat of a central row of three row seats is slidably moved forward with a seat back folded toward the seat so as to allow a back passenger to get on/off a vehicle. Further, the vehicle seats normally have an arrangement to allow a passenger to slide the seat forward or backward according to a physical form or preference of the passenger.

In a case where the vehicle seat is equipped with both the function (walk-in function) where a motor drives a seat cushion with the seat back folded theretoward to slide forward so as to allow the back passenger to get on/off the vehicle and a function to allow a seated passenger to slide the seat in a front-back direction according to the physical shape or preference of the passenger, the vehicle seat must be equipped with a sensor which detects the full-forward position of the seat cushion to disable the motor when the seat with the seat back folded theretoward is driven by the motor to slide forward, and a sensor for detecting the position of the seat such that a pulling force of a seat belt is controlled according to the position of the seat when the seated passenger slidably moves the seat in the front-back direction.

Patent Literature 1 discloses an arrangement where the position sensor is mounted to the vehicle seat equipped with a slide function so as to enable the control of the start time of airbag deployment according to the positional information of the seat with the passenger seated thereon. However, Patent Literature 1 does not suggest that the pulling force of the seat belt (restraining force applied by the seat belt to the seated passenger or tensile force of the seat belt) is controlled according to the positional information of the seat with the passenger seated thereon.

Furthermore, Patent Literature 1 does not teach that the vehicle seat equipped with the slide function is adapted to detect the full-forward position of the sliding movement and to stop the sliding movement.

On the other hand, Patent Literature 2 discloses an arrangement where the seat reaching the full-forward position is detected by means of the limit switch and the seat is stopped. However, the patent literature does not teach acquiring the positional information of the seat with the passenger seated thereon.

The present invention addresses to solve the above-mentioned problems of the prior arts and provides a vehicle seat including an integral bracket which is mounted with a sensor for detecting the full-forward position when the seat cushion with the seat back folded theretoward is driven by the motor to slide forward, and a sensor for detecting the position of the seat when the seated passenger slidably moves the seat in the front-back direction.

Solution to Problem

According to an aspect of the invention for solving the above problems, a vehicle seat with an integral bracket includes: a seat cushion; a seat back foldable toward the seat cushion; a slide rail movable in a front-back direction as carrying the seat cushion thereon; a stationary rail for guiding the slide rail; and a drive motor for driving the slide rail in the front-back direction along the stationary rail, and has an arrangement wherein an integral sensor bracket mounted with a magnetic sensor and a limit switch is secured to the slide rail, and a magnetic body to be detected by the magnetic sensor and a detection plate for actuating the limit switch are mounted to the stationary rail.

According to another aspect of the invention for solving the above problems, a vehicle seat with an integral bracket includes: a seat cushion; a seat back foldable toward the seat cushion; a slide rail movable in a front-back direction as carrying the seat cushion thereon; a stationary rail for guiding the slide rail; and a drive motor for driving the slide rail carrying thereon the seat cushion with the seat back folded theretoward in the front-back direction along the stationary rail, the vehicle seat further including: a magnetic sensor for detecting a position of the slide rail with respect to the stationary rail in a state where the seat back is raised from the seat cushion; a limit switch for detecting a full-forward position of the slide rail when the slide rail carrying thereon the seat cushion with the seat back folded theretoward is driven forward by the drive motor along the stationary rail; and an integral sensor bracket which is mounted with the magnetic sensor at a forward portion thereof with respect to the slide rail and mounted with the limit switch at a portion thereof backward from the magnetic sensor, thus securing the magnetic sensor and limit switch to the slide rail.

Advantageous Effects of Invention

According to the aspect of the invention, the vehicle seat includes the integral bracket which is mounted with the sensor for detecting the full-forward position of the slide rail when the seat with the seat back folded theretoward is slidably moved forward and is mounted with the sensor for detecting the position of the seat when the seated passenger slidably moves the seat in the front-back direction. Thus, the vehicle seat is adapted to reliably detect the full-forward position of the slide rail when the seat with the seat back folded theretoward is slidably moved forward. Further, the vehicle seat is adapted to enhance the seating comfortableness by controlling the pulling force of the seat belt (restraining force on the seated passenger as applied by the seat belt or tensile force of the seat belt) according to the position of the seat detected in a state where the passenger is seated on the seat.

According to the other aspect of the invention, in the case where the both sensors are mounted to the integral bracket, if a foot of the passenger abuts on the bracket, the bracket is configured such that the foot contact against the bracket less affects the sensor having a high sensitivity for detecting the seat position when the seated passenger slidably moves the seat in the front-back direction. This ensures that the pulling force of the seat belt (restraining force on the seated passenger as applied by the seat belt or tensile force of the seat belt) is positively controlled.

DESCRIPTION OF EMBODIMENTS

Figure 1:
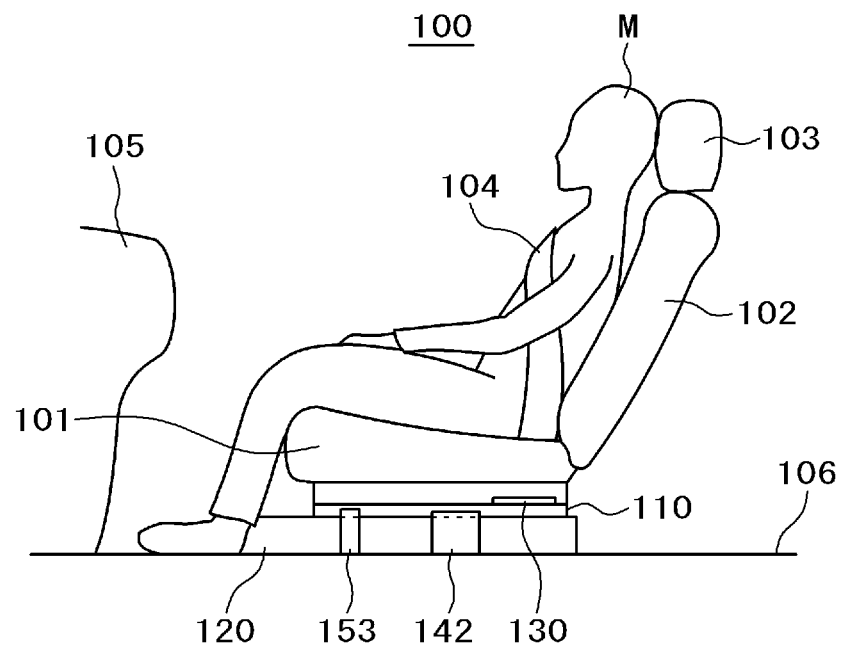
FIG. 1 is a side view of a vehicle seat with an integral bracket according to a first embodiment of the invention, showing a state where a passenger is seated on the seat.

The invention relates to a vehicle seat of a type (walk-in function) where a front passenger seat of double row seats or a door side seat of a central row of three row seats is slidably moved forward with a seat back thereof folded theretoward so as to allow a back passenger to get on/off a vehicle. More particularly, the invention relates to the vehicle seat equipped with an integral bracket and a function to allow the seated passenger to slidably move the seat in the front-back direction according to a physical shape or preference of the passenger. The invention relates to the vehicle seat equipped with an integral bracket which is mounted with: a sensor for detecting a full-forward position when a seat cushion with the seat back folded theretoward is driven by a motor to slidably move forward; and a sensor for detecting a position of the seat when the passenger seated thereon slidably moves the seat in the front-back direction.

The invention is adapted for reliable detection of the full-forward position when the seat cushion with the seat back folded theretoward is driven by the motor to slide forward and is adapted to control a pulling force of a seat belt (restraining force on the seated passenger as applied by the seat belt or tensile force of the seat belt) according to the position of the seat so as to obviate the impairment of seating comfortableness even when the seat position is shifted.

The invention features a simple structure where the sensor for detecting the full-forward position when the seat cushion with the seat back folded theretoward is slidably moved forward and the sensor for detecting the position of the seat when the passenger seated thereon slidably moves the seat in the front-back direction are mounted on the shared integral bracket. In addition, if a foot of the passenger abuts on the bracket, the bracket is configured such that the foot contact against the bracket less affects the sensor having a high sensitivity for detecting the seat position when the seated passenger slidably moves the seat in the front-back direction. This ensures that the pulling force of the seat belt (restraining force applied by the seat belt onto the seated passenger or tensile force of the seat belt) can be controlled stably and reliably.

A vehicle seat with an integral bracket according to an aspect of the invention includes: a seat cushion; a seat back foldable toward the seat cushion; a slide rail movable in a front-back direction as carrying the seat cushion thereon; a stationary rail for guiding the slide rail; and a drive motor for driving the slide rail in the front-back direction along the stationary rail. The vehicle seat is configured such that a sensor bracket mounted with a magnetic sensor and a limit switch is secured to the slide rail, and a magnetic body to be detected by the magnetic sensor and a detection plate for actuating the limit switch are mounted to the stationary rail. The vehicle seat is adapted to control the pulling force of the seat belt depending upon whether or not the magnetic sensor mounted to the slide rail detects the sensor bracket formed of the magnetic body mounted to the stationary rail in a state where the seat back is raised.

A vehicle seat with an integral bracket according to another aspect of the invention includes: a seat cushion; a seat back foldable toward the seat cushion; a slide rail movable in a front-back direction as carrying the seat cushion thereon; a stationary rail for guiding the slide rail; and a drive motor for driving the slide rail carrying thereon the seat cushion with the seat back folded theretoward in the front-back direction along the stationary rail. The vehicle seat further includes: a magnetic sensor for detecting a position of the slide rail with respect to the stationary rail in a state where the seat back is raised from the seat cushion; a limit switch for detecting a full-forward position of the slide rail when the slide rail carrying thereon the seat cushion with the seat back folded theretoward is driven forward by the drive motor along the stationary rail; and an integral sensor bracket which is mounted with the magnetic sensor at a forward portion thereof with respect to the slide rail and mounted with the limit switch at a portion thereof backward from the magnetic sensor so as to secure the magnetic sensor and the limit switch to the slide rail.

Embodiments of the invention will hereinbelow be described in detail with reference to the accompanying drawings. Throughout the figures illustrating the embodiments hereof, equal or similar reference numerals are assigned to equal or similar components, which are explained only once in most cases to avoid repetitions. It is noted, however, that the invention should not be construed as being limited to the embodiments set forth herein. Various changes and modifications will be apparent to those skilled in the art unless otherwise such changes and modifications depart from the scope of the invention.

First Embodiment

FIG. 1 is a side view of a vehicle seat 100 according to an embodiment of the invention. The vehicle seat 100 includes: a seat cushion 101 for a passenger M to be seated on; a seat back 102 which the seated passenger rests his/her back on; and a head rest 103 for supporting a head of the passenger. Indicated at 104 is a seat belt which holds the seated passenger M in the seat.

Indicated at 110 is a slide rail (upper rail) while a stationary rail (lower rail) is indicted at 120. The seat cushion 101 is mounted to the slide rail (upper rail) 110. The stationary rail (lower rail) 120 is fixed to a floor 200 of the vehicle.

Indicated at 130 is an integral sensor bracket for retaining sensors to be described hereinafter. The sensor bracket 130 is secured to the slide rail (upper rail) 110. A detection bracket 142 is formed of a magnetic material and mounted to the stationary rail (lower rail) 120. The detection bracket is detected by a magnetic sensor to be described hereinafter. Indicated at 153 is a detection plate, against which a switch button of a limit switch (described hereinafter) is pressed such that the limit switch is actuated. A slide-rail drive motor 160 is fixed to a side of the stationary rail (lower rail) 120. Under the control of an unillustrated controller, the drive motor drives the slide rail (upper rail) 110 carrying the seat cushion 101 with the seat back 102 folded theretoward to move forward or backward relative to the stationary rail (lower rail) 120.

Figure 2:
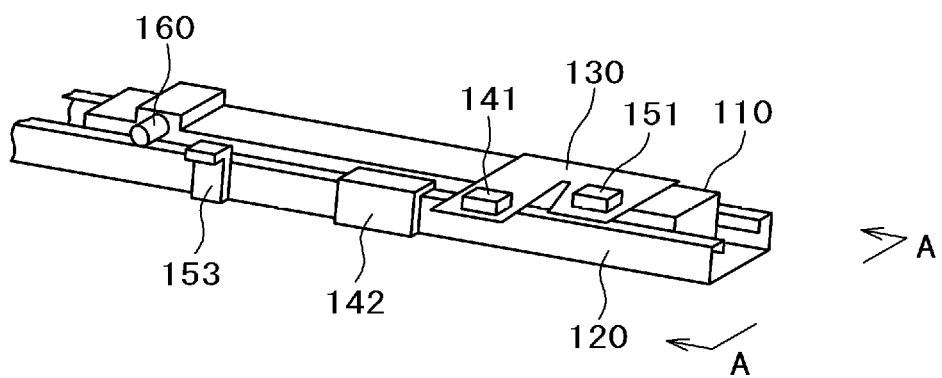
FIG. 2 is a perspective view of a slide rail of the vehicle seat with an integral bracket according to the first embodiment hereof.

FIG. 2 is a perspective view showing the slide rail (upper rail) 110 mounted to the stationary rail (lower rail) 120.

An integral sensor bracket 130 (hereinafter, written simply as sensor bracket 130) carrying thereon a magnetic sensor 141 and a limit switch 151 is secured to the slide rail (upper rail) 110. On the other hand, fixed to the stationary rail (lower rail) 120 are the detection bracket 142 formed of the magnetic material to be detected by the magnetic sensor 141, and a detection plate 153 which actuates the limit switch 151 by allowing a switch button 152 of the limit switch 151 to be pressed thereagainst.

Figure 3:
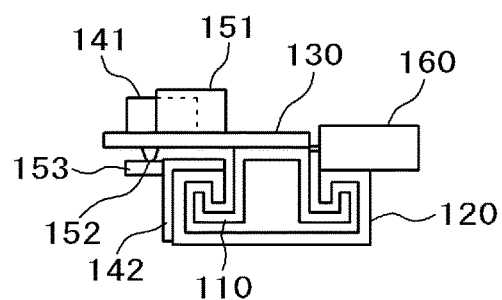
FIG. 3 is a view of the slide rail of the vehicle seat with an integral bracket according to the first embodiment hereof, taken along the arrowed line A-A in FIG. 2.

FIG. 3 is a view of the slide rail (upper rail) 110 mounted to the stationary rail (lower rail) 120 of FIG. 2 as seen in the direction A-A. The sensor bracket 130 carrying the magnetic sensor 141 and the limit switch 151 thereon is secured to the slide rail (upper rail) 110, while the detection bracket 142 and the detection plate 153 are fixed to the stationary rail (lower rail) 120.

When the slide rail (upper rail) 110 is so moved as to bring the magnetic sensor 141 to place above the detection bracket 142, the magnetic sensor 141 detects the detection bracket 142 made of the magnetic body. At this time, a distance between the magnetic sensor 141 and the detection bracket 142 is normally set to 1 to 3 mm although the value may vary depending upon the detection sensitivity of the magnetic sensor 141.

If the set distance is less than 1 mm, there is a risk of the magnetic sensor 141 breaking up by collision with the detection bracket 142. If the set distance is more than 3 mm, the magnetic sensor 141 may possibly be decreased in detection sensitivity, failing to detect the detection bracket 142. It is therefore necessary to fix the magnetic sensor 141 and the detection bracket 142 to place respectively so that the distance between the magnetic sensor 141 and the detection bracket 142 does not change from the first set value.

Figure 4:
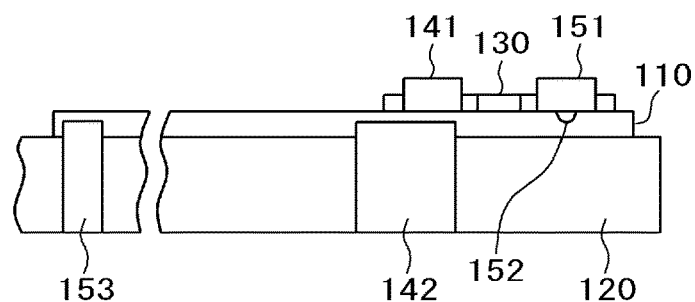
FIG. 4 is a side view of the slide rail of the vehicle seat with an integral bracket according to the first embodiment hereof, showing a state where the upper rail is located at a full-backward position by slidably moving the seat backward so that a magnetic sensor detects a detection bracket.

FIG. 4 is a side view showing a state where the slide rail (upper rail) 110 is mounted to the stationary rail (lower rail) 120 and is located at a full-backward position, namely a state where the seat cushion 101 is slidably moved to the back. In this state, the magnetic sensor 141 is located at a top side of the detection bracket 142. The magnetic sensor 141 detects the detection bracket 142.

In response to an output signal from the magnetic sensor 141 in this state, the unillustrated controller controls an unillustrated seat-belt drive mechanism such that the pulling force of the seat belt 104 (restraining force on the seated passenger as applied by the seat belt or tensile force of the seat belt) is set to a previously stored first level.

Figure 5:
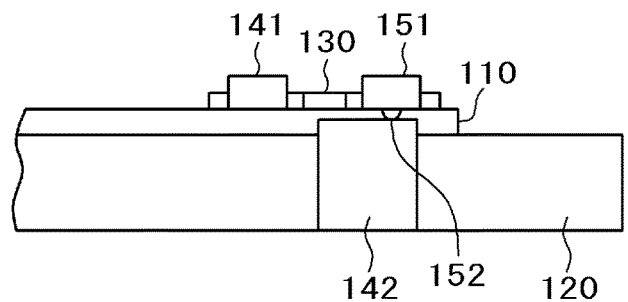
FIG. 5 is a side view of the slide rail of the vehicle seat with an integral bracket according to the first embodiment hereof, showing a state where the upper rail is located at forward of the full-backward position by sildably moving the seat forward so that the magnetic sensor does not detect the sensor bracket.

On the other hand, FIG. 5 is a side view showing a state where the passenger shifts the seat cushion 101 in the front-back direction so that the slide rail (upper rail) 110 is slightly slid forward from a state where the slide rail (upper rail) 110 is located at the full-backward position, namely a state where the seat cushion 101 is slid forward. In this state, the magnetic sensor 141 is displaced from the detection bracket 142. The magnetic sensor 141 does not detect the detection bracket 142 formed of the magnetic material.

Further, the unillustrated controller controls the unillustrated seat-belt drive mechanism such that the pulling force of the seat belt 104 (restraining force on the seated passenger as applied by the seat belt or tensile force of the seat belt) is set to a previously stored second level (smaller restraining force or tensile force than the first force level). This permits the restraining force on the seated passenger as applied by the seat belt to be set to substantially the same level as that before the slide rail is slid forward (when the cushion seat is located on the back while the magnetic sensor 141 detects the detection bracket 142). This ensures that the comfortableness for the seated passenger is not impaired.

Figure 6:
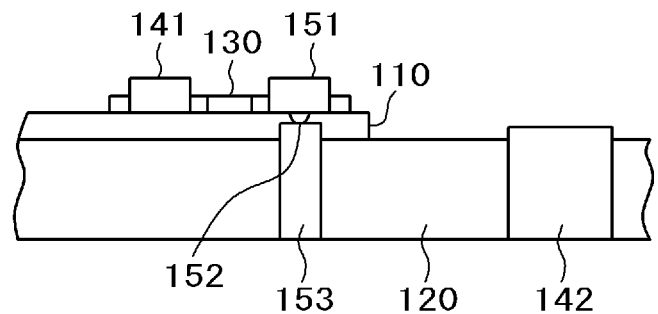
FIG. 6 is a side view of the slide rail of the vehicle seat with an integral bracket according to the first embodiment hereof, showing a state where the upper rail is located at a full-forward position so that a limit switch is operating.

FIG. 6 shows a state where after the seat back 102 is folded toward the seat cushion 101 and an unillustrated sensor detects the folded seat back 102, the slide-rail drive motor 160 drives the slide rail (upper rail) 110 to slide forward along with the seat cushion 101 so that the full-forward position of the sliding movement of the slide rail (upper rail) 110 is detected by the limit switch 151. With the slide rail at the full-forward position of the sliding movement, the switch button 152 of the limit switch 151 is pressed against the detection plate 153 so that the limit switch 151 is actuated. In response to a signal from this limit switch 151, the unillustrated controller disables the slide-rail drive motor 160.

Figure 7:
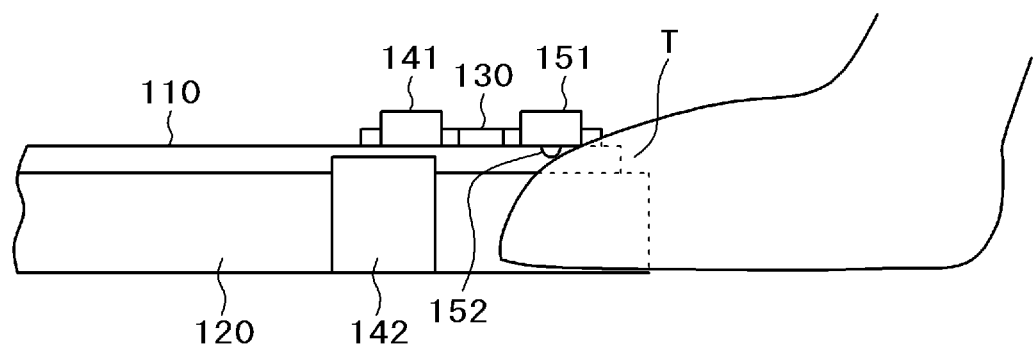
FIG. 7 is a side view of the slide rail of the vehicle seat with an integral bracket according to the first embodiment hereof, showing a state where the upper rail is located at the full-backward position while a toe of a passenger seated on a back seat abuts on the sensor bracket.

FIG. 7 shows a state where in the state shown in FIG. 4, the passenger seated on the back seat puts his/her foot under a seat so that his/her toe T abuts on the sensor bracket 130. When the toe T of the passenger on the back seat abuts on the sensor bracket 130 in this manner, the sensor bracket 130 is subjected to a bending force.

Figure 8:
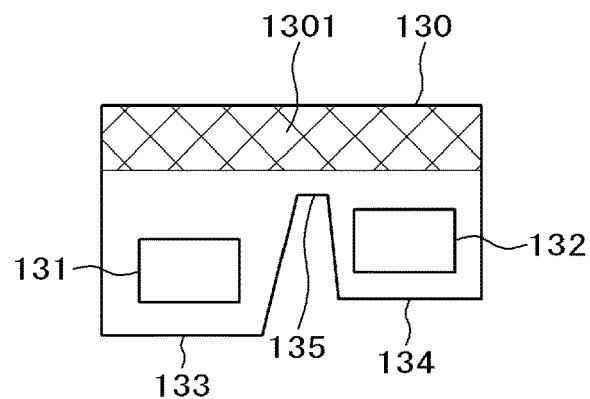
FIG. 8 is a plan view of the sensor bracket of the vehicle seat with an integral bracket according to the first embodiment hereof.

FIG. 8 shows a plan view of the sensor bracket 130. The sensor bracket 130 is formed with a hole 131 for mounting the magnetic sensor 141 and a hole 132 for mounting the limit switch 151. The sensor bracket 130 is secured to the slide rail (upper rail) 110 at a plurality of places in a cross-hatched area 1301 by means of screw, bolt or welding.

The position of the hole 131 for mounting the magnetic sensor 141 and that of the hole 132 for mounting the limit switch 151 differ from each other with respect to the up-and-down direction as seen in FIG. 8. Hence, an end 133 of a portion formed with the hole 131 for mounting the magnetic sensor 141 protrudes from an end 134 of a portion formed with the hole 132 for mounting the limit switch 151.

In the state shown in FIG. 7, the portion formed with the hole 132 for mounting the limit switch 151 is subjected to an upward force with respect to the drawing surface of FIG. 8.

It is noted here that the sensor bracket 130 is formed with a slit portion 135 or a notch between the portion formed with the hole 131 for mounting the magnetic sensor 141 and the portion formed with the hole 132 for mounting the limit switch 151. In the sensor bracket 130 having the above-described configuration and secured to the slide rail (upper rail) 110, when the portion formed with the hole 132 for mounting the limit switch 151 is subjected to the upward force or a force pushing up from the back side of the drawing sheet of FIG. 8, this upward force concentrates on the slit portion 135.

As a result, the portion formed with the hole 131 for mounting the magnetic sensor 141 becomes less deformable. Hence, the magnetic sensor 141 is not varied in height so that the sensor bracket can maintain a constant distance between the magnetic sensor 141 and the detection bracket 142.

As just described, the sensor bracket 130 is configured such that if an external force is applied to the portion mounted with the limit switch 151, the portion mounted with the magnetic sensor 141 is little affected by the external force. Hence, the magnetic sensor 141 susceptible to the change in height can be maintained at a constant height.

This ensures that when the passenger seated on the seat slides the seat, the magnetic sensor 141 can reliably detect the detection bracket 142 so that the restraining force applied by the seat belt onto the seated passenger can be positively controlled.

As described above, the embodiment enables the magnetic sensor and the limit switch to be mounted on the shared bracket by ensuring that if the external force is applied to the limit switch side, the magnetic sensor is not affected by the external force. Thus, a simpler structure can be used for mounting the magnetic sensor and the limit switch to the slide rail (upper rail) 110.

First Modification

Figure 9:
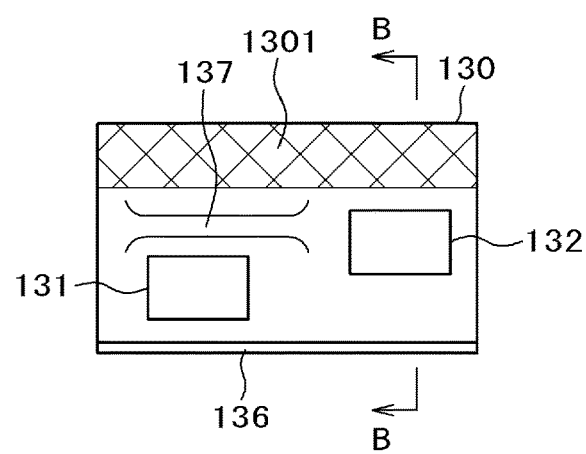
FIG. 9 is a plan view of a sensor bracket of a vehicle seat with an integral bracket according to a second embodiment hereof.

The first embodiment illustrates the example where the sensor bracket 130 is formed with the slit portion 35 between the portion mounted with the magnetic sensor 141 and the portion mounted with the limit switch 151. A first modification illustrates an example where the sensor bracket 130 described with reference to FIG. 8 is replaced by a sensor bracket 130-1 as shown in FIG. 9. The components other than the sensor bracket 130-1 are the same as those illustrated by the first embodiment and hence, the description thereof is dispensed with.

Similar to the sensor bracket 130, the sensor bracket 130-1 according to the first modification is formed with the hole 131 for mounting the magnetic sensor 141, and the hole 132 for mounting the limit switch 151.

The sensor bracket 130-1 according to the first modification is not formed with the slit portion 135 which is formed in the sensor bracket 130. Instead, a bent portion 136 is formed by bending an end portion of the sensor bracket 130-1 at a right angle. The bent portion spans the portion formed with the hole 131 for mounting the magnetic sensor 141 and the portion formed with the hole 132 for mounting the limit switch 151. Further, a rib 137 is formed at place between the hole 131 for mounting the magnetic sensor 141 and the bent portion 136 at the end of the sensor bracket. This configuration increases the rigidity of the sensor bracket 130-1 against a bending force applied upward from the back side of the drawing surface of FIG. 9. Particularly, the portion formed with the hole 131 for mounting the magnetic sensor 141 is also formed with the rib 137 and hence, the portion is further increased in rigidity against the bending force applied upward from the back side of the drawing sheet.

Figure 10:
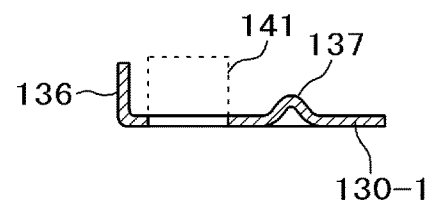
FIG. 10 is a sectional view of the sensor bracket of the vehicle seat according to the second embodiment hereof, taken along the arrowed line B-B in FIG. 9.

FIG. 10 shows a sectional view of the sensor bracket taken on the line B-B in FIG. 9. Just as in the case of the first embodiment, if the external force is applied to the portion mounted with the limit switch 151 when the toe T of the passenger seated on the back seat gets caught on this portion, the portion mounted with the magnetic sensor 141, which has high rigidity against the bending force, is hardly deformed. Hence, the magnetic sensor 141 susceptible to the change in height can be maintained at the constant height.

This ensures that the magnetic sensor 141 can reliably detect the detection bracket 142 when the seated passenger slides the seat and the restraining force applied by the seat belt onto the seated passenger can be positively controlled.

Second Modification

The sensor bracket 130-1 according to the first modification has the bent portion 136 formed by bending the end portion thereof substantially at a right angle, the bent portion spanning the portion formed with the hole for mounting the magnetic sensor 141 and the portion formed with the hole 132 for mounting the limit switch 151.

Figure 11:
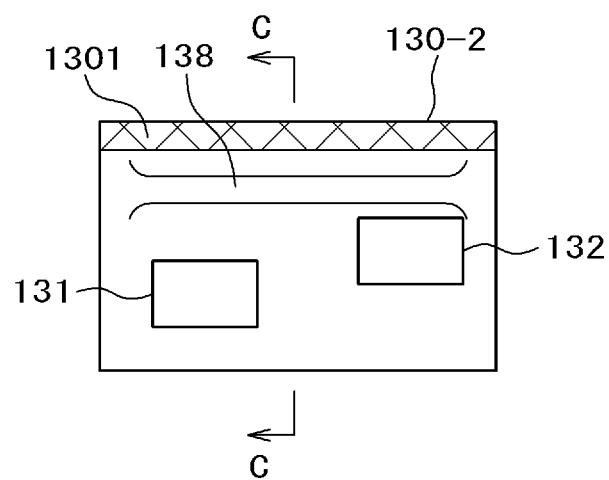
FIG. 11 is a plan view of a sensor bracket of a vehicle seat with an integral bracket according to a third embodiment hereof.

On the other hand, a sensor bracket 130-2 according to a second modification as shown in FIG. 11 is formed with rib 138 in place of the bent portion 136 substantially bent at a right angle. The rib 138 extends on one side of the hole 132 for mounting the limit switch 151.

Figure 12:
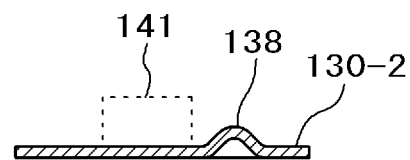
FIG. 12 is a sectional view of the sensor bracket of the vehicle seat with an integral bracket according to the third embodiment hereof, taken on the arrowed line C-C in FIG. 11.

FIG. 12 shows a sectional view of the sensor bracket taken on the line C-C in FIG. 11. The rib 138 is formed on one side of the hole 131 for mounting the magnetic sensor 141 so that the related portion is increased in the rigidity against the bending force applied upward from the back side of the drawing sheet of FIG. 11. Just as in the case of the first embodiment, if the external force is applied to the portion mounted with the limit switch 151 when the toe T of the passenger seated on the back seat gets caught on this portion, the portion mounted with the magnetic sensor 141 is hardly deformed. Hence, the magnetic sensor 141 susceptible to the change in height can be maintained at the constant height.

This ensures that when the seated passenger slides the seat, the magnetic sensor 141 can reliably detect the detection bracket 142 so that the restraining force applied by the seat belt onto the seated passenger can be positively controlled.

The foregoing embodiments provide a specific explanation of the embodiment of the invention but do not limit the invention. That is, an arrangement where a part of the structure illustrated by the embodiment is replaced with means having an equivalent function and an arrangement that omits a part of insubstantial function are also construed as being included in the invention.

REFERENCE SIGNS LIST

100 . . . vehicle seat,
101 . . . seat cushion,
102 . . . seat back
103 . . . head rest
104 . . . seat belt
110 . . . slide rail (upper rail)
120 . . . stationary rail (lower rail)
130 . . . sensor bracket
135 . . . slit portion
136 . . . bent portion
137,138,139 . . . rib
141 . . . magnetic sensor
142 . . . detection bracket
151 . . . limit switch
153 . . . detection plate
160 . . . slide-rail drive motor

The invention claimed is:

1. A vehicle seat with an integral bracket comprising:
a seat cushion;
a seat back foldable toward the seat cushion;
a slide rail movable in a front-back direction as carrying the seat cushion thereon;
a stationary rail for guiding the slide rail; and
a drive motor for driving the slide rail in the front-back direction along the stationary rail,
wherein an integral sensor bracket mounted with a magnetic sensor and a limit switch is secured to the slide rail, and
a magnetic body to be detected by the magnetic sensor and a detection plate for actuating the limit switch are mounted to the stationary rail.

2. The vehicle seat with an integral bracket according to claim 1,
wherein the sensor bracket is mounted with the magnetic sensor at a forward portion thereof with respect to the slide rail moved in the front-back direction and is mounted with the limit switch at a portion thereof backward from the magnetic sensor.

3. The vehicle seat with an integral bracket according to claim 2,
wherein the sensor bracket is formed with a slit between the portion mounted with the magnetic sensor and the portion mounted with the limit switch.

4. The vehicle seat with an integral bracket according to claim 2,
wherein the sensor bracket has an end portion bent at a right angle, the bent portion spanning the portion mounted with the magnetic sensor and the portion mounted with the limit switch.

5. The vehicle seat with an integral bracket according to claim 2,
wherein the sensor bracket has a configuration where the portion mounted with the magnetic sensor has greater rigidity against bending than the portion mounted with the limit switch.

6. A vehicle seat with an integral bracket comprising:
a seat cushion;
a seat back foldable toward the seat cushion;
a slide rail movable in a front-back direction as carrying the seat cushion thereon;
a stationary rail for guiding the slide rail; and
a drive motor for driving the slide rail carrying thereon the seat cushion with the seat back folded theretoward in the front-back direction along the stationary rail,
the vehicle seat further comprising:
a magnetic sensor for detecting a position of the slide rail with respect to the stationary rail in a state where the seat back is raised from the seat cushion;
a limit switch for detecting a full-forward position of the slide rail when the slide rail carrying thereon the seat cushion with the seat back folded theretoward is driven forward by the drive motor along the stationary rail; and
an integral sensor bracket which is mounted with the magnetic sensor at a forward portion thereof with respect to the slide rail and mounted with the limit switch at a portion thereof backward from the magnetic sensor, thus securing the magnetic sensor and limit switch to the slide rail.

7. The vehicle seat with an integral bracket according to claim 6,
wherein the sensor bracket has a configuration where a bending force applied to the portion mounted with the limit switch is less transmitted to the portion mounted with the magnetic sensor.

8. The vehicle seat with an integral bracket according to claim 7,
wherein the sensor bracket is formed with a slit between the portion mounted with the limit switch and the portion mounted with the magnetic sensor.

9. The vehicle seat with an integral bracket according to claim 6,
wherein a tensile force of a seat belt mounted to a vehicle equipped with the vehicle seat is controlled based on information on the position of the slide rail with respect to the stationary rail as detected by the magnetic sensor in a state where the seat back is raised from the seat cushion.

10. The vehicle seat with an integral bracket according to claim 7,
wherein a tensile force of a seat belt mounted to a vehicle equipped with the vehicle seat is controlled based on information on the position of the slide rail with respect to the stationary rail as detected by the magnetic sensor in a state where the seat back is raised from the seat cushion.

* * * * *